(No Model.)
W. HUNTER.
WATER FILTER.
No. 594,695. Patented Nov. 30, 1897.
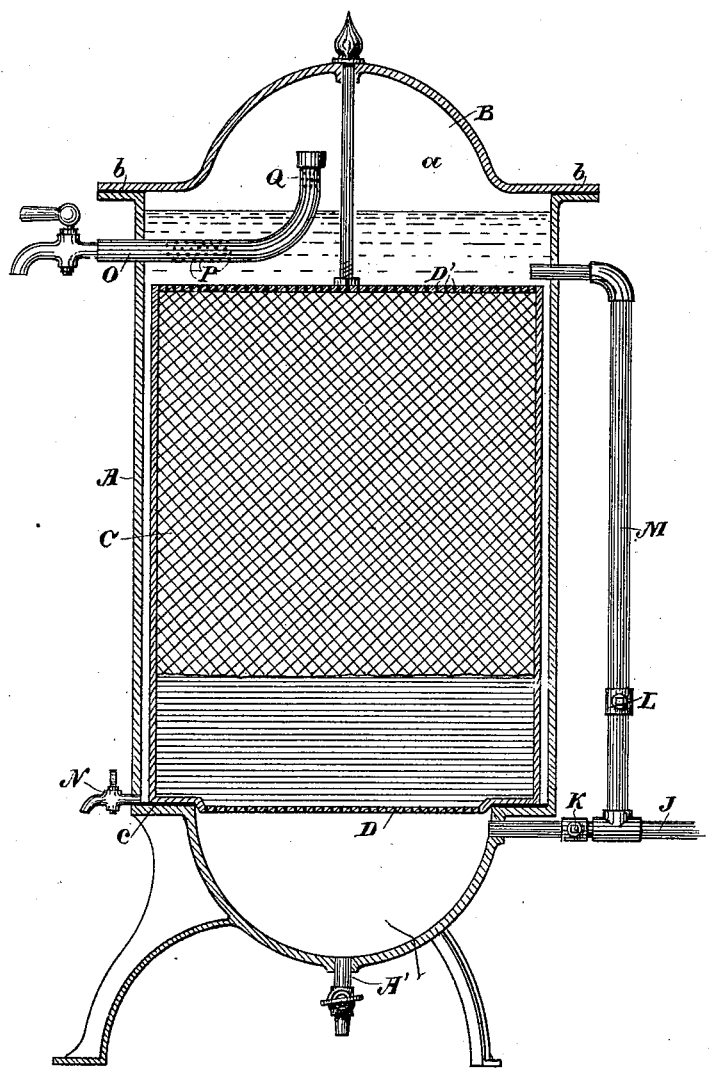
Witnesses,
J. H. Amsse
H. F. Ascheck
Inventor,
William Hunter
By Dewey & Co.
Attys
THE NORRIS PETERS CO., PHOTO-LITHO., WASHINGTON, D. C.

United States Patent Office.

WILLIAM HUNTER, OF SAN FRANCISCO, CALIFORNIA, ASSIGNOR, BY DIRECT AND MESNE ASSIGNMENTS, TO JOHN B. McGLEW, OF SAME PLACE.

WATER-FILTER.

SPECIFICATION forming part of Letters Patent No. 594,695, dated November 30, 1897.

Application filed June 22, 1897. Serial No. 641,745. (No model.)

*To all whom it may concern:*

Be it known that I, WILLIAM HUNTER, a citizen of the United States, residing in the city and county of San Francisco, State of California, have invented an Improvement in Water-Filters; and I hereby declare the following to be a full, clear, and exact description of the same.

My invention relates to an improved filter for water.

It consists, essentially, in the combination, with an exterior case, of an interior removable chamber containing any suitable filtering substance, an inlet-pipe with pressure-regulating valve opening into the lower part of the main chamber beneath the filtering-chamber, whereby the filtering takes place by an upward pressure, a settling-chamber and blow-off cock, and a discharge-pipe connecting with the upper clear-water chamber above the filter and so constructed that the water discharged therefrom is properly aerated during the discharge.

It also consists in details of construction which will be more fully explained by reference to the accompanying drawing, in which the figure is a vertical section of my filter.

A is an outer case or chamber, which may be made of any suitable size and preferably cylindrical for convenience. The lower part of this chamber is made concave or conical, so that any sediment retained therein will settle into the lower portion, from which it may be drawn or blown out by means of a cock, (shown at A'.) Above this chamber is an annular seat formed in the case A, upon which the interior filter-chamber C is supported. A gasket or collar, of any suitable impermeable substance, rests upon this seat, as shown at c, and this prevents leakage around the interior filter-chamber. This chamber has a perforated bottom and top, as shown at D D', and the intermediate space between these perforated plates is filled with any well-known suitable filtering material, such as gravel, charcoal, and other substances usually employed for this purpose.

I have shown the lower plate D of the filter made with an offset or shoulder that rests upon the seat and package-flange c, the central portion of the bottom D being a little lower than the part which rests upon the seat and being connected therewith by an inclined offset which centers the chamber C when the latter is placed within the chamber A, thus leaving a small annular passage around the filtering-chamber. This chamber may be locked in place in any suitable manner, either by rods or bolts or by other well-known or appropriate means.

The outer case A has a cap or cover B, which in the present case is shown as arched or convex, and it may be bolted or otherwise secured by means of coincident flanges b around the periphery and a suitable gasket to prevent leakage. When the cover is removed, the inner filter-chamber C may be disengaged and removed for convenient cleansing or repacking and again returned and the cover secured.

A water-supply is brought into the lower concave part of the chamber A and below the bottom of the filter-chamber C by means of a supply-pipe J, and the pressure under which the water is delivered into this chamber may be regulated or cut off by any suitable cock, as shown at K. When the water is delivered into the lower part of the chamber A, the pressure causes it to gradually percolate upward through the filtering material in the chamber C, and it is eventually delivered, through the upper perforated plate D', into the chamber a above the filter. Any heavy sediment will sink to the bottom of the concave chamber, and lighter sediment will be prevented from passing into the filtering material by reason of its being delivered upwardly from below, and the whole of this sediment can be washed out by opening the blow-off cock at A' and discharging a jet of water directly into the chamber.

Whenever it is desired to wash off the lower portion of the filter, it may be done by delivering the water into the upper chamber a under pressure and allowing it to pass downwardly through the filtering material. This is done by closing the cock K and opening a cock L in the pipe M, which leads upwardly from the pipe J and discharges into the upper portion of the filter, as shown.

N is a small cock connecting with the interior of the chamber A just above the seat upon which the filter-chamber is supported, and this allows any small quantity of water which passes in around the interior chamber C to be withdrawn whenever it is desired to entirely empty the chamber or to draw off such water as may have settled into this annular space.

The discharge-pipe O from the upper reservoir is provided with a suitable cock or faucet at the outer end through which water may be drawn from the filter.

The interior of either or both the inner and the outer chambers may be lined with porcelain or other substance which will not rust or corrode.

An important feature of the construction is the extension of the pipe O into the interior of the chamber $a$, where it is upturned and has a cap O' closing the upper end. The horizontal portion of the pipe O is perforated with numerous holes, as shown at P, for the passage of water from the chamber A into the pipe. In order to properly aerate this water, I have shown holes made in that portion of the pipe which is above the surface of the water in the chamber. Air is always carried up with the water and accumulates in the chamber $a$ in sufficient quantities for ordinary use.

The holes Q admit air which is drawn into the pipe by the vacuum produced by the discharge whenever water is drawn through the discharge-pipe, and this air is thus at once intermingled with the water which passes out and thoroughly aerates the water at the instant of its being drawn from the filter. If more air is necessary where large quantities of water are being drawn, the chamber $a$ may be charged by first closing the water-supply cocks K and L, thus opening the sediment-cock A', and finally the clear-water-discharge cock O. The water passing out through the passage A' produces a vacuum which draws the water down through the filter, and this causes air to enter the chamber $a$ through the faucet and pipe O until the chamber $a$ is sufficiently charged, when the cocks are returned to their normal condition and the filter operates, as previously described.

By the use of a gage or observation glass the water in the upper reservoir can always be kept at the proper level and the inlet-holes in the discharge-pipe kept submerged.

When a large supply of filtered water is required, two or more of these filters may be connected with inlet and outlet pipes common to both, so as to form a battery of any desired capacity.

Having thus described my invention, what I claim as new, and desire to secure by Letters Patent, is—

1. In a filter, an exterior chamber having an annular seat surrounding the lower portion, an interior removable filter-chamber adapted to rest upon said seat having perforated bottom and top plates and a filling of filtering materials, a concave chamber formed in the outer case below the filter-chamber, and a reservoir-chamber situated above the filter-chamber, a pipe with controlling-cock through which water is admitted into the lower chamber under pressure whereby it is forced upwardly through the filtering material into the reservoir-chamber, a blow-off pipe connecting the lower part of the receiving-chamber, a branch from the inlet-pipe opening into the reservoir-chamber above, having a controlling-cock, and an aerating discharge-pipe from the reservoir-chamber.

2. The combination with an exterior case and an interior filtering-chamber removably secured therein, of a concave supply-chamber formed in the lower part of the outer case and an inlet-pipe through which water is delivered thereinto under pressure, a reservoir-chamber situated above the filter, a discharge-pipe the inner end of which is bent upwardly above the surface of the water in the reservoir-chamber with perforations therein for the admission of air, and perforations made in the submerged portion of the discharge-pipe whereby water is admitted and intermingled with the air at the instant of discharge.

3. In a water-filter, an exterior case, an interior filter-chamber intermediate between a receiving and sediment chamber in the lower part of the outer case, and a clear-water-reservoir chamber at the top, a curved discharge-pipe from the reservoir-chamber, the submerged portion of which has water-inlet openings and the portion above the water-line has air-inlet openings whereby the water is aerated at the instant of withdrawal.

4. In a water-filter, an exterior case, an interior filter-chamber intermediate between a receiving and sediment chamber in the lower part of the outer case, and a clear-water-reservoir chamber at the top, inlet-pipes to both lower and upper chambers, with controlling-cocks, a sediment-discharge cock at the bottom of the lower chamber, a pipe partly submerged in the reservoir-chamber having openings for the simultaneous admission and mixing of both water and air when the discharge-cock is opened, said pipe also serving for the admission of air from the outside into the reservoir-chamber by opening its faucet after closing the inlet-cocks and opening the sediment-discharge cock.

In witness whereof I have hereunto set my hand.

WILLIAM HUNTER.

Witnesses:
S. H. NOURSE,
JESSIE C. BRODIE.